(12) United States Patent
Horstmann

(10) Patent No.: US 6,334,214 B1
(45) Date of Patent: *Dec. 25, 2001

(54) TRY/BUY WRAPPING OF INSTALLATION-READY SOFTWARE FOR ELECTRONIC DISTRIBUTION

(75) Inventor: Cay Horstmann, Cupertino, CA (US)

(73) Assignee: Preview Software, Cupertino, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/053,950

(22) Filed: Apr. 3, 1998

(51) Int. Cl.[7] .................................. G06F 9/44
(52) U.S. Cl. ................................. 717/11
(58) Field of Search .................. 705/26, 27; 380/4; 500/4; 379/193.12; 717/11

(56) References Cited

U.S. PATENT DOCUMENTS

| | | | |
|---|---|---|---|
| 5,014,234 | 5/1991 | Edwards, Jr. ................ | 364/900 |
| 5,689,560 * | 11/1997 | Cooper et al. ............... | 380/4 |
| 5,708,709 * | 1/1998 | Rose .......................... | 380/4 |
| 5,729,594 * | 3/1998 | Klingman .................... | 379/93.12 |
| 5,771,347 * | 6/1998 | Grantz et al. ................. | 713/200 |
| 5,883,954 * | 3/1999 | Ronning ..................... | 500/4 |
| 5,883,955 * | 3/1999 | Ronning ..................... | 380/4 |

OTHER PUBLICATIONS

Winzip Version 6.0A Nico Mak Comp–hng Inc, 1995.*
Digital Distribution Wars, The Forrester Report Michael Putnam et al., Apr. 1999.*
IBM Crypotolopes, Super Distribution and Digital Rights Management, M. Naplan Version 1.3.0, Dec. 30, 1996.*
IBM Crypolopes, General Information Version 1, Release 1, Dec. 1997.*
IBM Crypotolopes, Programming Guide Release 1, Dec. 1997.*
Sm@rtCert Technology, Cybersource, 1997.*
ESD Enjoy Flurry of Strategic Support, Computer Retail Week Bradely Fikes, Apr. 28, 1997.*

(List continued on next page.)

Primary Examiner—Mark R. Powell
Assistant Examiner—Todd Ingberg
(74) Attorney, Agent, or Firm—Burns Doane Swecker & Mathis LLP

(57) ABSTRACT

The present invention, generally speaking, provides a semi- or fully-automated process that allows an electronic collection of software titles previously made ready for installation to be Try/Buy enabled. In accordance with an exemplary embodiment of the invention, the process involves, for each of a potentially large number of software programs, identifying how the software program has been made ready for installation, and consulting a table or database to determine how, based on the installation particulars, to unpack and repack the setup file set, or program archives The program archive is unpacked, executable modules are identified, and one or more of thee modules are chosen for Try/Buy wrapping. Repacking may be performed by modifying the program archive or by entirely rebuilding the program archive. The setup ruleset remains unchanged. A secondary executable setup file is therefore optionally provided to perform an additional setup steps that may be required for proper Try/Buy operation. These additional steps may be necessitated by the requirements of certain setup tools that prohibit replacement of a file in the setup file set with a larger file. For those setup tools, the repacking steps involve inserting some information into the original setup file set and appending additional information past the end, and the recombining these material to yield the Try/Buy enabled version of the software.

22 Claims, 3 Drawing Sheets

OTHER PUBLICATIONS

Building New Services on Cyber Foundation, Computer Retail Week, Apr. 28, 1997.*

Electronic Distribution Stacks Up, Computer Reseller News M. Marshall, Aug. 11, 1997.*

Oyen Market Ink Alliance with Portland Software Computer Reseller News, Aug. 18, 1997.*

Internet Shnnkwrap, PC Magazine, Nov. 4, 1997.*

Installation Without Aggravation, Windows Sources Peter Coffee vol. 5 No. 7 p 88, Jul. 1997.*

E–Data Sues 22 More Companies For Infringing Internet Patent, Business Wire, Mar. 26, 1996.*

Electronic Software Delivery and Wearables Sexbold Report By L. Kingsley vol. 2 No. 4 p 3, Dec. 1997.*

Ziplock 2.0 Released Portland Software Unveils Premier Electronic Software Distribution, Prncuguirp, Mar. 10, 1997.*

Litlenet Implements New Technology To Offer State–Of–The Art Web Enabled Electronic Software Distribution Services, Dec. 18, 1997.*

Before You Buy That Software, Business Week, Mar. 2, 1998.*

The Android Installers, LAN Magazine, Tom Henderson, Aug. 1996.*

Clancy, Heather, "Pirate's Demise or Cashing in on ESD", *Computer Reseller News*, No. 761, p. 19 (1999).

*Computer Reseller News*, VRCity Driving ESD—"Little known wholesaler paves way to distribution via the Web", No. 760, p. 163 (1997).

Marshall, Melanie, "ESD: Preview wraps it up—TimeLock 3.0 lets resellers wrap 'try–before–you–buy' versions", *Computer Reseller News*, No. 752, p. 116 (1997).

Continuus Software Corporation's *ObjectMake Guide*, pp 1–156 (1996).

* cited by examiner

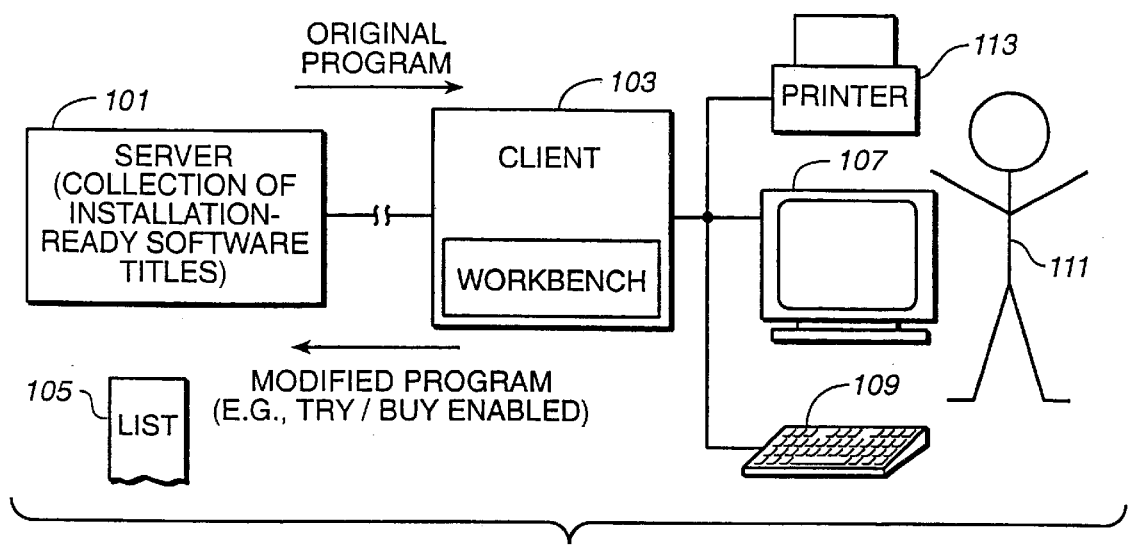

FIG._1

| | | | |
|---|---|---|---|
| DETECTION METHOD 1 (E.G., FINGERPRINT) | OUTCOME 1 | UNPACKING METHOD 1 | REPACKING METHOD 1 |
| | OUTCOME 2 | UNPACKING METHOD 2 | REPACKING METHOD 2 |
| | ⋮ | ⋮ | ⋮ |
| | OUTCOME N | UNPACKING METHOD N | REPACKING METHOD N |
| DETECTION METHOD 2 (E.G., COPYRIGHT) | OUTCOME 1 | UNPACKING METHOD 1 | REPACKING METHOD 1 |
| | OUTCOME 2 | UNPACKING METHOD 2 | REPACKING METHOD 2 |
| | ⋮ | ⋮ | ⋮ |
| | OUTCOME N | UNPACKING METHOD N | REPACKING METHOD N |
| ⋮ | ⋮ | ⋮ | ⋮ |
| DETECTION METHOD N | ⋮ | ⋮ | ⋮ |

FIG._3

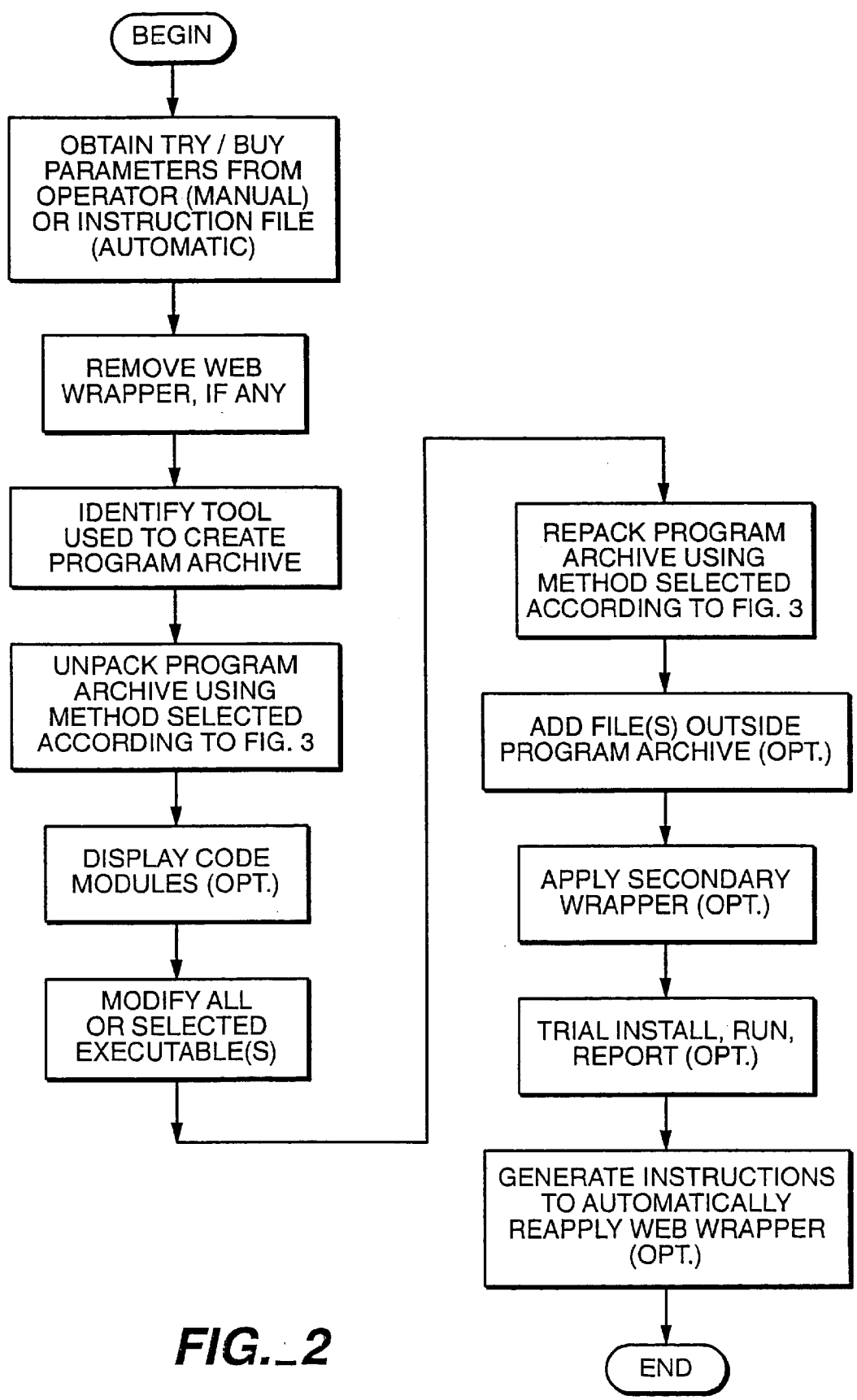
FIG._2

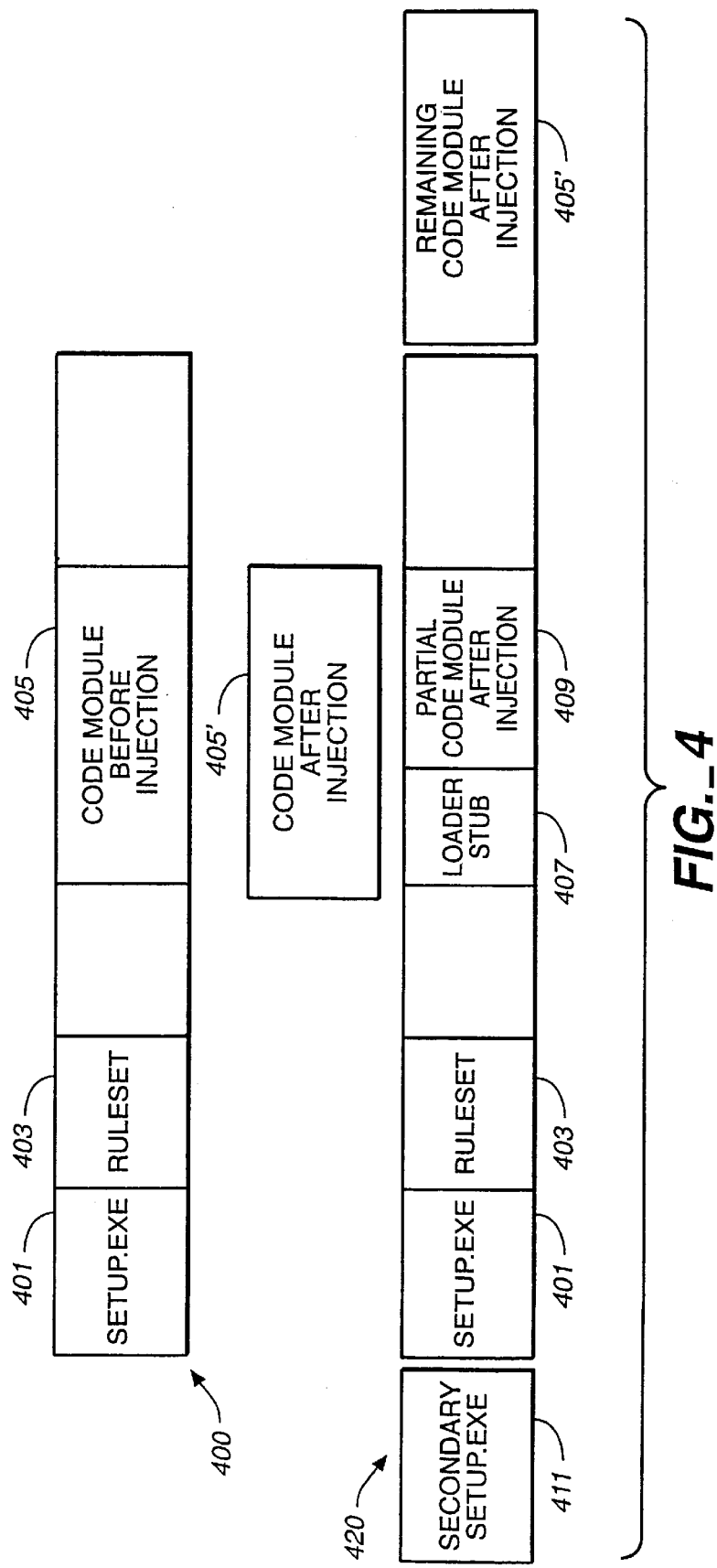
FIG._4

TRY/BUY WRAPPING OF INSTALLATION-READY SOFTWARE FOR ELECTRONIC DISTRIBUTION

BACKGROUND OF THE INVENTION

1. Field of the Invention

The present invention relates to electronic software distribution, more particularly "Try/Buy" electronic software distribution.

2. State of the Art

The Internet is quickly becoming the preferred distribution medium for software that has heretofore been distributed in shrink-wrapped form. Files many megabytes in size can be easily downloaded in a period of minutes, and future increases in network bandwidth promise to make electronic software distribution even more convenient.

Electronic software distribution (ESD) follows one of two models, referred to herein as Buy/Try and Try/Buy. The Buy/Try model is consistent with shrink-wrapped software distribution in that the customer must first buy the software before being able to load and use the software. No opportunity is afforded to try the software prior to making a buying decision. In the Try/Buy model, the customer is allowed to try the software during a trial period. At the end of the trial period, the customer may decide to do nothing, in which case the software expires and becomes unusable, or may decide to purchase the software electronically through the Internet, in which case the trial software is converted to a paid-up copy.

Buy/Try ESD is technically straight-forward. Try/Buy ESD is technically more challenging. Only recently has there become available a tool (sold by the present assignee) that allows a software publisher to readily perform its own Try/Buy software "wrapping." Such wrapping involves the modification of one or more program executables and/or code libraries and is therefore performed, at least in part, prior to preparation of a setup file set and corresponding ruleset. Typically, the files of a software program are compressed, sometimes fully or partially encrypted and archived in a setup file set. A corresponding setup ruleset (stored in one or more files as part of the file set) describes what to do with each file during installation. An installer (e.g., "setup.exe") unpacks the archive and installs the various files in accordance with the setup ruleset. This process is well-known and widely followed throughout the software industry, and tools for performing the process are available from a number of different vendors including, for example, InstallShield Software Corporation of Schaumburg, Ill., Great Lakes Business Solutions Corporation of Canton, Minn., and 20/20 Software Corporation of Beaverton, Oreg. In the case of software intended for distribution over the Web, a further Web wrapper may be added that functions as a single container for the setup file set.

Because tools enabling software publishers to do Try/Buy self-wrapping have just recently become available, extensive electronic collections of software titles already exist where the software titles have previously been made ready for installation in accordance with the foregoing process. Presently, these software collections cannot be Try/Buy enabled.

SUMMARY OF THE INVENTION

The present invention, generally speaking, provides a semi- or fully-automated process that allows an electronic collection of software titles previously made ready for installation to be Try/Buy enabled. In accordance with an exemplary embodiment of the invention, the process involves, for each of a potentially large number of software programs, identifying how the software program has been made ready for installation, and consulting a table or database to determine how, based on the installation particulars, to unpack and repack the setup file set, or program archive. The program archive is unpacked, executable modules are identified, and one or more of these modules are chosen for Try/Buy wrapping. Repacking may be performed by modifying the program archive or by entirely rebuilding the program archive. The setup ruleset remains unchanged. A secondary executable setup file is therefore optionally provided to perform an additional setup steps that may be required for proper Try/Buy operation. These additional steps may be necessitated by the requirements of certain setup tools that prohibit replacement of a file in the setup file set with a larger file. For those setup tools, the repacking steps involve inserting some information into the original setup file set and appending additional information past the end, and the recombining these material to yield the Try/Buy enabled version of the software.

BRIEF DESCRIPTION OF THE DRAWING

The present invention may be further understood from the following description in conjunction with the appended drawing. In the drawing:

FIG. 1 is a simplified block diagram of an environment in which the present invention may be used;

FIG. 2 is a flowchart illustrating the present software modification process;

FIG. 3 illustrates a portion of a table used to identify a tool used to produce a program archive and to direct unpacking and repacking of a program archive; and FIG. 4 illustrates an unpacking/repacking process in accordance with one embodiment of the present invention.

DETAILED DESCRIPTION OF THE PREFERRED EMBODIMENTS

In the following description, the meaning of the following terms is as follows:

code module: one or more executable programs or program libraries such as Dynamic Link Libraries (DLL) in the Windows™ operating system.

setup file set: one or more files that cooperate to achieve installation and setup of one or more code modules on a computer system.

packing, unpacking, repacking: producing a setup file set including one or more code modules and having a predetermined arrangement of files; extracting the code modules from the setup file set; producing again a setup file set having the same arrangement of files.

wrapping: adding code to a code module to control execution of that code module.

Referring now to FIG. 1, an environment in which the present invention may be used will be described. A server 101 is assumed to store a collection of installation-ready software titles. The number of software titles in the collection may be many thousands. The value of the collection may be considerably enhanced by modifying, e.g. performing a process to Try/Buy enable, all or as many of the software tides as possible. Because of the large number of titles, however, the process must be as automated as possible.

Modification of the software titles is performed by an extensible software tool, or "Workbench," running on a client machine. The Workbench 103 provides not only for a software package in the form of a setup file set to be broken out but also allows the software program to be modified and put back into a modified setup file set in a transparent manner. The Workbench may be run for a batch of files (automatic mode) or a single file. In the case of automatic mode, a list 105 is provided to the Workbench of software titles to be modified. The Workbench 103 retrieves the software titles one by one from the server 101, modifies the software titles, and writes the software titles back to the server. The Workbench 103 realizes a semi- or full-automatic system for modifying installation-ready software titles. In the case of a semi-automatic system, a display screen 107 and a keyboard 109 are provided for use of an operator 111.

During a modification session, each modified software title is tested to ensure that no bugs have been introduced. At the conclusion of a modification session, a report is produced summarizing the results of the session and, optionally, a record of the operator actions that were necessary to facilitate the rewrapping process in order to monitor operator activity and to continuously increase the automated unwrapping capability of the workbench system. The report may be stored in electronic form or may optionally be printed using a printer 113.

Referring to FIG. 2, a flowchart of the modification process is shown. The process flow will be described generally, after which each process step will be described in greater detail.

A software program may have a Web commerce wrapper applied to allow it to be sent as a single downloadable file. If so, the Web commerce wrapper is stripped off. Then an identification routine is performed to identify what vendor's tool (and which version) was used to prepare the program archive. Then a lookup is performed to determine vendor-specific unpacking and repacking methods to be used.

Using the appropriate vendor-specific unpacking method, the program archive is unpacked. Code modules within the archive are identified and (optionally) displayed. If the code modules are displayed, the operator is provided an opportunity to select which code modules should be wrapped. The selected code modules (or possibly all of the code modules) are then modified. The software program is then repacked using the appropriate vendor-specific method.

A quality-assurance step then follows in which a trial install is performed and the program is run, e.g. under the observation of the operator. The operator indicates whether any abnormality was observed. The results of the test are saved as part of a report.

As a final step, any files are added that are required by the wrapped code, such as commerce instructions, and a secondary wrapper is applied to the software program. The purpose of this secondary wrapper is to install any files that may have been added to the software program. If no files are added, then this step may be omitted.

Each of the foregoing steps will now be described in greater detail.

To automatically identify what vendor's tool was used to produce the program archive, the program header of the executable setup file ("setup.exe") is read and examined. Typically, the program header will contain a copyright notice that unambiguously identifies the vendor. The copyright notice may not identity the program version, however. To identify the program version, a "fingerprint" (check-sum) of the first, say, 2 Kbytes of the executable setup file may be computed and compared to fingerprints previously computed and tabulated for the most popular tools.

Referring more particularly to FIG. 3, there is provided as part of the Workbench a table listing various detections methods (e.g., fingerprint, copyright notice, etc.) and various outcomes of those respective methods. For each outcome, two further table entries appear. One entry identifies an unpacking method to be used on the file set. The other entry identifies the corresponding repacking method to be used.

The steps for unpacking and repacking may differ greatly from tool to tool. In the case of unpacking, for example, a tool provided as part of the tool's software package may be used to unpack the archive. Alternatively, the vendor may under separate agreement provide a tool that may be used (separately from the executable setup file) to unpack the archive. In other instances, only the executable setup file itself may have the capability to unpack the archive, i.e., write the files of the archive in uncompressed/unencrypted form to a temporary location. Various installation options may exist, for example typical install, compact install, full install. In this situation, the script may run the actual setup program, wait for the operator to select "full install," and run a second program that uses the operating system capability to monitor the creation of new files and registry entries. Selecting the full install option, however, is not guaranteed to install everything in the program image. For this reason, the latter alternative, doing a full install to unpack the file set, is less preferred.

Unpacking the program archive allows executable code modules within the program to be identified (either explicitly by a tool or by observation) and selectively modified. In the case of Try/Buy, the purpose of modifying the software program is to in effect install a gate through which the user must pass in order to use the program. A single gate is the simplest scheme and generally works the best. However, a program may have multiple executable code modules that may be closely coupled or loosely coupled. Certain code modules may be shared among several applications, such as distinct applications in an "office" package. Installing a gate to that code module would then protect all applications sharing that module. Conversely, a set of plug-ins to an unprotected shell program may need to be locked by installing a shared gate to all plug-in modules.

In accordance with one embodiment of the invention, the code modules are queried in order to identify which code modules are used by others. This information is then displayed to the operator in accordance with a logical organization that makes the relationships between the code modules apparent. The operator may then select one or more code modules to be modified.

Modification of the code modules may include "injecting" the code modules with a protector module, i.e., the "gate" referred to previously. Such injection is described in detail in U.S. patent application Ser. No. 08/921,394 filed on Aug. 29, 1997, incorporated herein by reference.

Following modification, the program archive is then repacked using an appropriate vendor-specific method in accordance with the script identified from the lookup table. Preferably, the program archive is not repacked from scratch—instead, the files in the existing program archive that have been modified are replaced and the program archive repacked to the extent necessary to accomplish such replacement In some instances, however, repacking the program archive from scratch may be unavoidable.

"Partial repacking" is possible in various circumstances. Vendor tools may allow for a file to be removed from the program archive and also allow for a file to be appended to the end of the program archive. In such an instance, the original file is removed and the corresponding modified added. In other instances, a file may be replaced within the archive by a file of the same or smaller compressed size. Since modification of a file will typically increase the size of the file (by adding a protector module, for example), partial repacking is accomplished in the following manner. At least one of the modified files is further modified to include a loader stub, described in detail in U.S. patent application Ser No. 08/921,402 filed on Aug. 29, 1997, incorporated herein by reference. Instead of replacing an original file with the actual modified (augmented) file, it is replaced with a stub, or placeholder, that may or may not contain part of the code of the modified file. The remainder of the modified file not contained in the stub is then added outside the program archive. Also added outside the program archive is a secondary executable setup file.

Referring more particularly to FIG. 4, the setup file set 400 before any modifications have been performed includes an executable setup program (setup.exe) 401, a rule set 403, and one or more code modules, including a code module 405 to be modified, or "injected" with additional code. The code module is extracted and injected in the manner described above, resulting in an injected code module 405'. The file set is then repacked. In the file set 420 produced after injection, the executable setup program 401 and the rule set 403 remain as before; however, the injected code module 405' is replaced with a loader stub 407 of the same name but smaller size. A portion of the injected code module is placed in the file space 409 previously occupied by the code module. The remaining portion of the injected code module 405' is added to the end of the file set but, since it is unknown to the executable setup program 401 and the ruleset 403, cannot be installed without additional outside help. A secondary executable setup program 411 is therefore added as a wrapper around the file set 420.

When the secondary executable setup program 411 is run, it puts the file(s) 405' added outside the program archive into a safe, well-chosen place. It then runs the primary (original) executable setup program 401. The primary executable setup program 401 proceeds with installation as it would have if nothing in the program archive had been changed. The installation is ineffective, however, in that one or more files are incomplete. When the program is first run, the loader stub 407 intervenes to rewrite the program, taking file(s) 405' from the safe place and putting them into their proper places. In particular, the loader stub 411 recombines the two portions of the injected code module and rewrites the combined injected code module into the proper place. The loader stub 411, having done its job, may schedule itself for deletion. There results a program identical to the program that would have resulted had the vendor tool been more accommodating in allowing changes to the program archive.

Alternatively, the secondary setup executable program may be designed to run, suspend itself while the primary executable setup program runs, and then resume. The secondary setup executable program when it resumes finds and performs a transformation on the two pieces of the injected code module to recover the modified code module 405'. The secondary setup executable program then writes the recombined injected code module into the proper place. The two pieces of code may be contiguous segments of the injected code module to later be concatenated. Alternatively, the two pieces may be a "base" file and a "difference" file. Combination of the two pieces involves processes the base file to reflect the differences represented in the difference file.

The vendor tool may not allow any changes to be made to the program archive. In this instance, partial repacking is indeed impossible, and repacking from scratch is required. The original setup ruleset, however, cannot be recreated and must be preserved. The vendor tool is therefore used to created a new program archive (with the modified file(s) replacing the corresponding original file(s)) and a empty or default new setup ruleset. The new setup ruleset is discarded. The new program archive is combined with the original setup ruleset to obtain a working installation file set. Advantageously, instructions for accomplishing the foregoing sequence of steps may be written in the directive language of the vendor tool itself.

Regardless of the facilities provided by the vendor tool, it may be desirable after repacking has been completed to add one or more files outside the program archive. In the case of Try/Buy ESD, for example, a license file is added outside the archive in such a manner as to be editable by multiple channel partners as described more fully in the first aforementioned patent application. After any such files have been added, a secondary wrapper is applied, including a secondary executable setup file. As has been previously described, the secondary executable setup file provides (possibly in conjunction with a rewriter module) for the proper installation of files added outside the program archive. With the secondary wrapper applied, the modified software program is complete and ready for testing.

Testing involves installing and running the software program. Complete testing would require that the software program be separately installed and run for each installation option. In instances where complete testing is not feasible, testing may be performed for a single installation option or some small number of installation options. Installation will typically require some manual intervention by the operator to click the appropriate controls. To "exercise" the program, however, the system will have previously obtained a knowledge of the various program executables and can direct execution of one or more of these within a program execution window. A separate GUI system control panel may be provided for the operator to "Accept" the modified software program is no abnormality was observed or "Reject" the modified software program if some abnormality was observed. Alternatively, since the most likely result of incorrect wrapping is either the absence of a "purchase" dialog or a program crash, these conditions can be detected automatically. The system then shuts down the modified software program and, if the modified software program was accepted, writes the program to disk on the server. Results of the testing are recorded. Test results for a session may be compiled into a report (by a report generator, for example) and either printed out or viewed online.

The rapidly-evolving nature of the software industry dictates that the Workbench be readily extensible. To extend the Workbench, the table of FIG. 3 is added to, i.e., to add a new detection method with its possible outcomes, or to account for outcomes of existing detection methods that were previously unknown or unaccounted for. The resulting new possibilities are then likely to call for new packing and unpacking methods. Code supporting these methods is then added to the Workbench.

It will be appreciated by those of ordinary skill in the art that the invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

What is claimed is:

1. Using a programmed computer, a method of adding executable code to a plurality of software programs each of which is stored as an archive of files, produced using a plurality of installation toolkits, comprising the steps of:

storing a table identifying for each of a plurality of different installation toolkits an unpacking mechanism to be used to unpack the archive and a repacking mechanism to be used to repack the archive; and, for each of a plurality of such archives of files:

identifying by reference to said table a particular unpacking method to be used to unpack the archive and a particular repacking method to be used to repack the archive;

unpacking the archive using the particular unpacking method;

wrapping each of said software programs by modifying selected code modules in each of said software programs of the unpacked archive; and repacking the archive using the particular repacking method.

2. The method of claim 1, wherein modifying the archive comprises adding additional executable code to the archive.

3. The method of claim 2, wherein the additional executable code is a protector module that implements Try/Buy functionality.

4. The method of claim 3, comprising the further steps of:

adding at least one additional file outside the repacked archive; and adding a secondary executable setup file outside the repacked archive.

5. The method of claim 4, wherein the secondary executable setup file functions to install said additional file so that the additional file may be found by the additional executable code.

6. The method of claim 5, wherein the secondary executable setup file further functions to run a primary executable setup file.

7. The method of claim 6, comprising the further steps of:

during unpacking of the archive, identifying executable code modules within the archive and displaying to an operator information identifying the executable code modules; and the operator selecting executable code modules operation of which is to be modified by adding said additional code.

8. The method of claim 6, comprising the further steps of:

running the secondary executable setup file and the primary executable setup file;

running the software program; and an operator observing running of the software program and inputting to the computer an indication of whether any abnormality was observed.

9. The method of claim 3, wherein unpacking is performed using a software tool provided with said installation toolkit.

10. The method of claim 3, comprising the further steps of:

analyzing a particular installation file format;

using results of the foregoing analysis step, programming a special-purpose software tool for performing unpacking said particular file format; and performing said unpacking using said special-purpose software tool.

11. The method of claim 3, wherein unpacking comprises executing said primary executable setup file to perform a dummy installation.

12. The method of claim 3, wherein repacking comprises using a software tool to replace an original version of a specified executable code module with a modified executable code module.

13. The method of claim 12, wherein repacking is performed using a software tool provided with said installation toolkit.

14. The method of claim 12, comprising the further steps of:

analyzing a particular installation file format;

using results of the foregoing analysis step, programming a special-purpose software tool for performing repacking said particular file format; and performing said repacking using said special-purpose software tool.

15. The method of claim 1, wherein modifying the archive comprises:

extracting a code module from the archive;

injecting the code module with additional executable code to produce an injected code module; and appending to the archive information relating to the injected code module.

16. The method of claim 15, comprising the further step of adding a secondary executable setup program external to the archive that functions to run a primary executable setup file and to process the appended information.

17. The method of claim 16, wherein said archive is repacked so as to include a loader stub within a part of the archive originally occupied by said code module.

18. The method of claim 17, comprising the further steps of:

executing the primary executable setup file to install the software program;

a user commanding execution of the software program; and prior to executing the software program, the loader stub rewriting the software program to place said injected code module in proper relation to the remainder of the software program.

19. The method of claim 16, comprising the further step of processing the injected code module to produce a first information portion and a second information portion;

wherein the first information portion is appended to the archive as said information relating to the injected code module, and the archive is repacked so as to include the second information portion within a part of the archive originally occupied by said code module.

20. The method of claim 19, comprising the further steps of:

executing the secondary executable setup program and thereby:

locating the first and second information portions;

transforming the first and second information portions to obtain again said injected code module; and writing the injected code module to a predetermined safe location.

21. The method of claim 20, wherein transforming comprises concatenating said first and second information portions.

22. The method of claim 20, wherein the one information portion represents differences between the other information portion and the injected code module, and said transformation comprises processing said differences.

* * * * *